United States Patent [19]
Demorest

[11] Patent Number: 4,741,125
[45] Date of Patent: May 3, 1988

[54] WICK-BASED LIQUID DELIVERY SYSTEM FOR PLANTS

[76] Inventor: Donald Demorest, 813 Westwood, Fenton, Mich. 48430

[21] Appl. No.: 842,671

[22] Filed: Mar. 21, 1986

[51] Int. Cl.$^4$ .............................................. A01G 25/00
[52] U.S. Cl. ......................................... 47/81; 47/48.5
[58] Field of Search ............... 47/81, 62, 79, 48.5; 137/386, 429; 251/11

[56] References Cited

U.S. PATENT DOCUMENTS

| | | | |
|---|---|---|---|
| 2,228,892 | 1/1941 | Zimmerman | 47/79 |
| 3,049,834 | 8/1962 | Heath | 47/81 |
| 3,069,807 | 12/1962 | Wall | 47/81 |
| 4,557,071 | 12/1925 | Fah | 47/81 |

FOREIGN PATENT DOCUMENTS 523640  2/1922  France ................................. 47/81

Primary Examiner—Robert A. Hafer
Assistant Examiner—Bradley M. Lewis
Attorney, Agent, or Firm—Krass and Young

[57] ABSTRACT

An apparatus for the delivery of water, nutrients or other liquid materials to the growing medium of potted plants, including a refillable chamber for the storage of the liquid, and means for attachment of the chamber to the vessel in which the growing medium is maintained. The chamber is equipped with a rigidly supported wick in the shape of an inverted U, one end of which is equipped with a float support, holding the wick in the liquid storage chamber. This allows adjustment of the depth of the wick into the chamber. The other end of the wick is inserted in a rigid passageway co-located with the growing medium. The apparatus is also equipped with an adjustable moisture-sensitive brake mechanism, regulating the movement of the wick support in relation to the liquid level in the refillable chamber thereby regulating the flow of liquid from the refillable chamber to the growing medium.

9 Claims, 2 Drawing Sheets

WICK-BASED LIQUID DELIVERY SYSTEM FOR PLANTS

BACKGROUND OF THE INVENTION

Self-watering flower pots, and the like, are well known in the art in relatively simply forms. U.S. Pat. No. 4,219,967 discloses a flower pot or plant holder equipped with a liquid storage reservoir in the base of said pot, which is connected by virtue of a relatively large wick through the bottom of the growing medium holder, to contact the growing medium and transmit moisture thereby.

U.S. Pat. No. 4,121,608 discloses the use of a separate reservoir, and a hose, the flow of liquid being regulated by the expansion of a wooden plug within a valve which is directly inserted into the growing medium, drawing moisture therefrom.

U.S. Pat. No. 4,223,837 discloses the use of a siphon operated liquid feed system from a reservoir and a float-regulated liquid level.

While all of the foregoing inventions operate, there remains a need for a more effective delivery system of liquids to the growing media of a plant which will not result in the over-watering or under-watering conditions which are common in the existing state of the art. Likewise, the current inventions all require frequent attention by virtue of evaporation losses, over-watering or inefficient liquid delivery systems.

The invention disclosed herein overcomes these limitations by use of a novel wick transmission system and support, and a feedback mechanism which regulates the liquid flow.

SUMMARY OF THE INVENTION

The invention provides an apparatus for the supply of water, nutrients or other liquid materials to the growing medium of potted plants. In particular, the invention comprises a purely mechanical and self-powered gravity feed system for the irrigation and feeding of plants, which includes a novel moisture feedback control system. The apparatus comprises a plant-containing vessel comprised of two distinct chambers, one filled with soil for the growing of the plant, and the other divided into three sub-chambers, one being a reservoir for water, one being a delivery passageway for water, and the third being a chamber containing a moisture feedback control system.

Liquid is delivered from a liquid storage chamber to the growing medium by virtue of a rigidly supported wick, which feeds a measured volume of water by gravity to the growing medium. The wick and its support may be enclosed with a clear cover to allow visual observation of the level of the liquid in the reservoir, by virtue of the standing height of the wick support.

A bi-expandable strip is located in a chamber immediately adjacent to the soil and vented to the soil chamber, thereby creating an atmosphere in said chamber holding the bi-expandable strip which is either moist or dry depending on the condition of the soil. When moist, the bi-expandable strip deforms, causing the upper end of said strip to apply pressure to the wick support, fixing the wick support in position and thereby slowing the delivery of liquid to the growing medium. When the growing medium is dry, the bi-expandable stip deforms in an opposite direction, releasing the wick support and allowing the wick assembly to retract into the liquid storage chamber, thereby increasing the flow of liquid to the medium.

Preferably, the bi-expandable strip is adjusted by means of a variable fulcrum, which regulates the deformable length of the bi-expandable strip, thereby establishing the moisture level in the chamber in which said bi-expandable strip is located, at which the strip effectively regulates the movement of the wick support assembly.

In addition, located within the liquid delivery chamber of the invention is a moisture flow indicator means, which is essentially a movable and balanced indicator, one end of which is mechanically connected to a sponge-like substance, which absorbs moisture, and accordingly, increases in weight. The flow of water to the soil is accordingly interdicted by the presence of a small moisture absorbing sponge attached to the pivotable indicator. When the moisture absorbing sponge is wet, it is of sufficient weight as to draw the flow indicator into a more or less upright position. When the sponge material is dry, the pivotable indicator returns to a more or less horizontal position, indicating the absence of water flow through the overall system.

The three sub-chambers containing the liquid delivery system and feedabck control may be manufactured as a unitary part of the chamber in which the growing medium is contained, or may be manufactured as a separate unit, suitable for attachment to an existing flowerpot or planter.

BRIEF DESCRIPTION OF THE DRAWING

Sheet 1 consists of three figures and sheet 2 consists of three figures.

Finally.

DESCRIPTION OF THE PREFERRED EMBODIMENT

Initially, it should be noted that while the drawings depict a unified structure for the automatic watering system described herein and the plant growing medium holder, and in fact, it is convenient to manufacture the compounds thus, by no means is it necessary to permanently attach the reservoirs of the automatic watering system to the medium holder. In fact, for large commercial installations, such as planters and the like, a series of movable automatic watering system apparatus can be attached to the growing medium container by suspending said apparatus from the edge of the growing medium container wherein planting it at some point in the surface of the growing medium. In both configurations, the invention functions in exactly the same fashion, the only difference being the absence of a permanent attachment between the automatic watering system reservoirs and chambers, and the medium holder.

Figure 1:
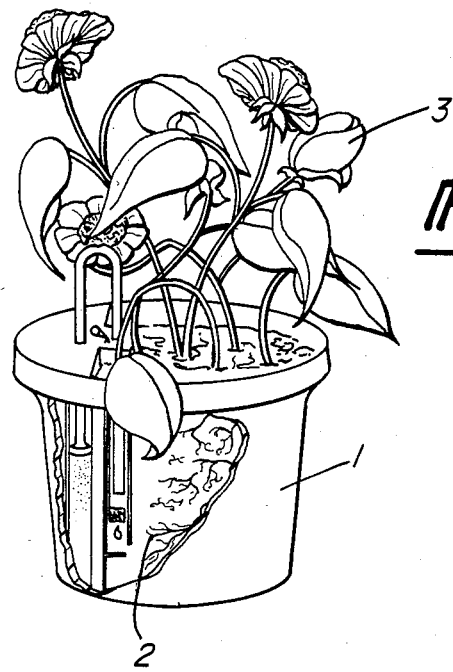
FIG. 1 is a perspective view of the plant container and automatic watering apparatus combination, with a portion of the container shown cut away to show the relationship of the liquid reservoir and the liquid delivery chamber.

Referring now to FIG. 1, the invention pertains to an apparatus for attachment to a plant-growing medium container (1), either permanently or non-permanently, comprising a liquid reservoir chamber, a liquid delivery passageway and a feedback control chamber, said reservoir and chambers being colocated with the growing medium and providing a regulated flow of liquid (for example, water or solutions of water or nutrients) to the soil or growing medium (2) in which the plant (3) is growing.

Figure 4:
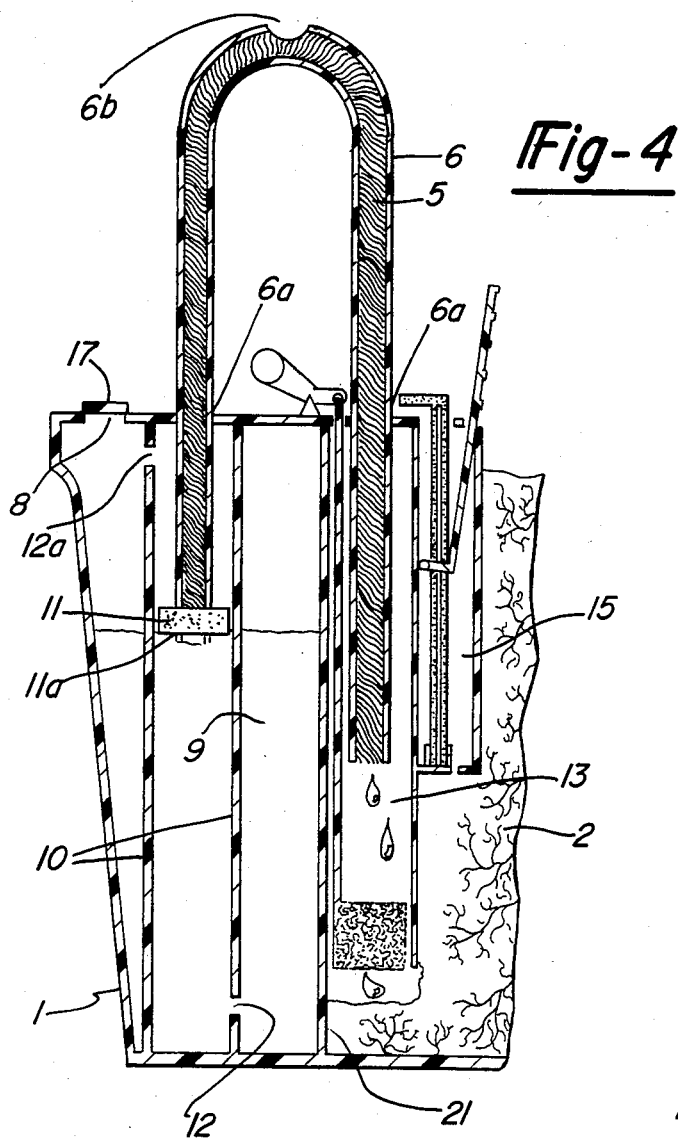
FIG. 4 is a cross-sectional view of the entire liquid delivery assembly, showing the relationship of the feedback control chamber and mechanism to the balance of the system components.

Referring now to FIG. 4, the growing medium container (1) is filled with soil, peat, mulch or other natural or artificial medium (2) in which are located one or more growing plants. Liquid reservoir chamber (9) is provided, and is separated from the liquid delivery chamber (13) by chamber wall (21). The third chamber in the automatic watering system apparatus is the feedback control chamber (15). Reservoir (9), chamber (13) and chamber (15) together contain the remaining components which comprise the invention herein described.

In the preferred embodiment, liquid is added to chamber (9) through opening (8), which is provided with a removable stopper (17). Contained within chamber (9) is a float guide (10), consisting of a cylinder of slightly larger inside diameter than the outside diameter of cylindrical float (11). The float guide cylinder (10) is connected to the liquid reservoir (9) by opening (12), insuring that the liquid level in the float guide (10) is the same as the liquid level in the balance of the chamber (9). The float guide (10) is also equipped with vent hole (12a) to allow full equalization of pressure. Immediately adjacent to reservoir (9) is liquid delivery chamber (13), which is connected to the growing medium portion of the vessel by virtue of opening (14).

A wick support tube in the shape of an inverted U (6) contains a wick (5) composed of suitable material to attract and allow the transmission of liquid. The wick support tube is inserted in openings (6a), thereby placing one end of the wick support tube into the liquid reservoir (9), and the other end of said wick support tube into the liquid delivery chamber (13). On the end of said tube disposed within reservoir (9), there is placed a float (11), which is roughly cylindrical in shape, and containing an opening (11a) in the center of said float (11), said opening (11a) being round, and of such diameter as to create a snug fit between the wick support tube (6) and the float (11). This fit is a sliding fit, allowing the regulation of the height of the wick support tube (6), thereby regulating the depth of the wick support tube (6) in relation to the fluid contained within reservoir (9). Said wick support tube feeds, by gravity, liquid to the reservoir (13), said liquid moistening the soil (2) contained within the growing medium chamber of the planter or flowerpot (1). Inasmuch as the flow of liquid from the reservoir (9) to the delivery chamber (13) is a function of the length of the columns of liquid supported by the wick (5) contained within the wick support (6), the rate of flow of the liquid can also be adjusted by sliding the float (11) upward or downward upon wick support (6). In the preferred embodiment of the invention, the clearance between the cylindrical float (11) and the float guide cylinder (10) is typically 0.5 millimeters or less. Manually depressing the float guide (6) in a downward direction forces the cylindrical float (11) into the float guide cylinder (10), temporarily increasing the fluid pressure inside the float guide cylinder (10), directing fluid forcibly into the wick (5) through the wick support (6), thereby priming the system to commence operation.

To insure proper functioning of the wick delivery system, a vent (6b) is provided in wick support (6).

Figure 6:
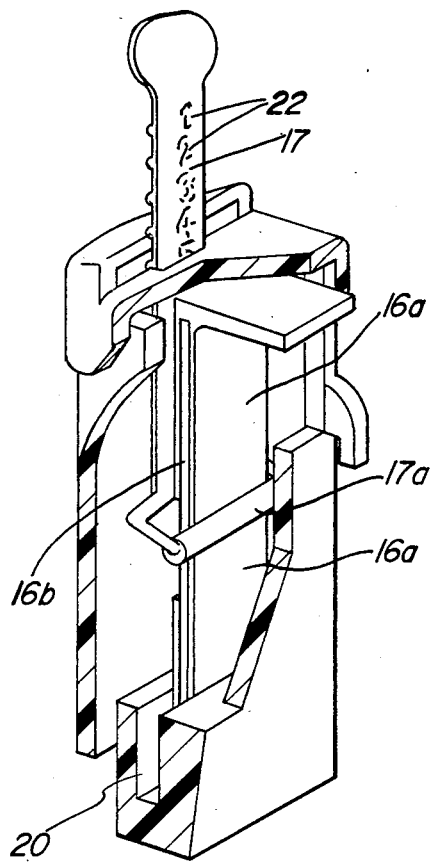
FIG. 6 is a cut away perspective view of the wetness feedback control components.
Figure 5:
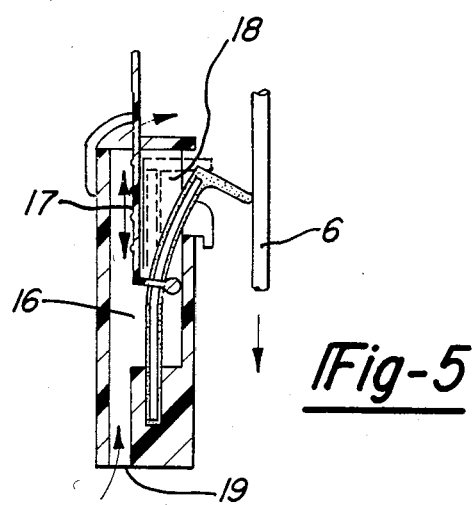
FIG. 5 is a detailed view of the method of operation of the bi-expandable strip, and its relationship to the wick support tube.

Referring now to FIGS. 5 and 6, contained within the feedback control chamber (15) is a bi-expandable strip (16), which consists of a flexible L-shaped pawl (16a) to which is attached a material, such as balsa wood, with a substantially different coefficient of expansion (16b). The lower end of said bi-expandable strip is secured to the floor of chamber (15) by insertion to slot (20). Chamber (15) is equipped with opening (19), allowing the moisture level of the growing medium (2) to affect the moisture level of the atmosphere contained within chamber (15).

The upper end of bi-expandable strip (16) passes through opening (18) in the top of the apparatus, allowing the end of the pawl (16) to contact the wick support (6) when the pawl (16) is moist. In the event that a wick support cover is installed, an opening is placed in the cover to allow the pawl to contact the wick support.

As the atmosphere contained within chamber (15) becomes dry, the layer (16b) of the bi-expandable strip contracts, resulting in the deformation of pawl (16), away from the wick support (6). Normally, the wick support (6) is suspended in the fluid contained within reservoir (9) based on the float height setting of float (11). In this configuration, a regular supply of liquid is provided through wick (5) to liquid delivery chamber (13). However, when the moisture level of the atmosphere in chamber (15) increases, layer (16b) of the pawl (16) expands, flexing the pawl (16) into a position toward wick support (6). The contact of pawl (16) against wick support (6) results in the fixation of wick support (6), preventing wick support (6) from any further downward movement, decreasing the flow of liquid from reservoir (9) to liquid delivery chamber (13) and subsequently to the soil.

Regulation of the action of pawl (16) is effected by a variable fulcrum assembly (17). Said variable fulcrum (17) is equipped with a cylindrical end piece (17a) disposed between the wall of feedback control chamber (15) and bi-expandable strip (16). The remaining portion of variable fulcrum (17) comprises a rigid handle, the upper portion of which protrudes through an opening above the level of the plant containing vessel. The upper end of said fulcrum (17) is equipped with graduations (22), to indicate the height at which the fulcrum is operating on the bi-expandable strip (16). Raising the variable fulcrum (17) decreases the operating length of pawl (16), thereby making the overall operation of the apparatus less sensitive to moisture, and increasing the flow of liquid to the growing medium. Lowering the fulcrum (17) increases the amount of travel allowed by pawl (16), thereby making the apparatus more sensitive, and reducing the amounts of moisture to be fed to the growing medium.

Figure 2:
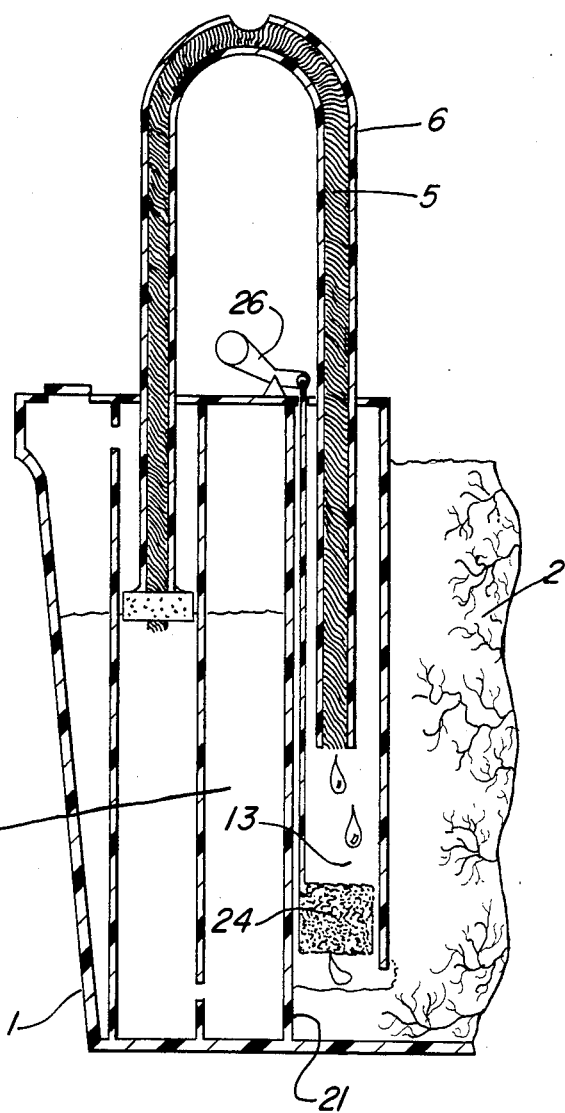
FIG. 2 is a cross-sectional view, showing the liquid reservoir and liquid delivery chambers, together with the flow indicator mechanism.
Figure 3:
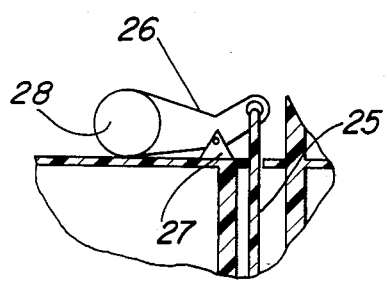
FIG. 3 is a detail of the flow indicator flag and pivot point.

Referring to FIGS. 2 and 3, to monitor the operation of the system more precisely, a flow indicator (26), mounted on a pivot point (27) is equipped with a flow indicator flag (28), cast or painted a highly contrasting color. The end of said pivoting flag disposed opposite the brightly colored indicator is attached to a rod (25), of suitable length to dispose the lower end of said rod (25) below the delivery end of the wick support tube (6), said rod being equipped with a semi-rigid, water absorbant material such as sponge, said semi-rigid water absorbant material (24) being attached to the end of the rod (25) oppositely disposed the connecting point of said rod to the pivotable indicator (26). The flow of water from the delivery end of wick support (6), located within the liquid delivery chamber (13) causes the moisture absorbing material (24) to become saturated, and consequently, heavier, causing a downward force on one end of the flow indicator (26) hereby raising the opposite end of said flow indicator (28) to a more or less vertical position. The absence of water flow of liquid flow to liquid delivery chamber (13) results in the drying of material (24), which, becoming lighter, allows the indicator (26) to pivot to a more or less horizontal position. By this means, the correct operation of the liquid delivery system can be visibly confirmed.

The invention thus described provides means for continuous delivery of liquids to a plant growing medium at a controlled rate, as well as means for indicating the level of liquid in the supply reservoir. While having thus described my invention in detail, it should be noted that many variations may be made therein without substantially deviating from the function, utility and operation herein described, and which would nevertheless be contemplated within the terms of the claims herein stated.

I claim:

1. An apparatus for the delivery of liquids to the growing medium of a plant comprising:
   (a) a refillable reservoir for the storage of said liquid;
   (b) a receiving reservoir for the receipt of said liquid;
   (c) a wick for transmission of said liquid from said refillable reservoir to said receiving reservoir;
   (d) support means for holding said wick in the approximate shape of an invert U, and float means for suspending one end of the wick support means inside the said refillable reservoir;
   (e) means for transmission of said liquid from said receiving reservoir to the growing medium of a plant;
   (f) a moisture-reactive adjustable pawl of bi-expandable material for regulating the movement of said wick in said refillable reservoir; and
   (g) means for attachment of one end of said pawl to said receiving reservoir so as to cause the opposing end of said pawl to contact said wick support means when said bi-expandable material is deformed.

2. An apparatus as described in claim 1, wherein said refillable reservoir further comprises an outer reservoir, and an inner reservoir of a shape designed to match the shape of said float means, and further comprising a series of openings in said inner reservoir.

3. An apparatus as described in claim 2, further comprising:
   a. A perforated compartment attached to the receiving reservoir;
   b. A deformable strip secured at the lower end of said compartment and positioned to contact said wick support means at the opposite end of said deformable strip; and
   c. A movable fulcrum disposed between the wall of said compartment and said deformable strip.

4. An apparatus as described in claim 3, wherein said movable fulcrum further comprises a bent rod, one end of which is equipped with a cylindrical and rotatable fulcrum, and the opposite end of which is equipped with a graduated scale.

5. An apparatus for the delivery of liquids to the growing medium of plants comprising:
   (a) a refillable reservoir for the storage of said liquids;
   (b) a perforated reservoir for the receipt of said liquid;
   (c) a wick for transmission of said liquid from said storage reservoir to said receiving reservoir;
   (d) support means for holding said wick in the approximate shape of an inverted U;
   (e) float means for suspending one end of the wick support means inside the said liquid reservoir chamber;
   (f) means for transmission of said liquids from said receiving reservoir to the growing medium of a plant;
   (g) a moisture-reactive adjustable pawl of bi-expandable material for regulating the movement of said wick in said refillable reservoir and
   (h) means for attachment of one end of said pawl to said receiving reservoir so as to cause the opposing end of said pawl to contact said wick support means when said bi-expandable material is deformed.

6. An apparatus as described in claim 5, wherein said adjustable pawl is located so as to contact said wick support means and secure said wick support means from movement by the exertion of pressure.

7. An apparatus as described in claim 6, further comprising:
   a. A pivotably mounted indicator flag located on the upper surface of the apparatus;
   b. A water absorbant material loosely placed within said receiving reservoir;
   c. A rod for connecting one end of said indicator to said moisture absorbing material;
   d. Bright colored material adhering to the end of said indicator opposite its point of attachment to said rod.

8. An apparatus for the holding of a growing medium and for the growing of potted plants, comprising:
   (A) a refillable reservoir for the storage of liquid;
   (B) a receiving reservoir for the receipt of said liquid;
   (C) a wick and wick support means for transmission of said liquid from said refillable reservoir to said receiving reservoir;
   (D) means for transmission of said liquid from said receiving reservoir to the growing medium of a plant;
   (E) a perforated compartment attached to the receiving reservoir;
   (F) a deformable strip secured at the lower end of said compartment and positioned to contact said wick support means at the opposite end of said deformable strip; and
   (G) a movable fulcrum disposed between the wall of said compartment and said deformable strip.

9. An apparatus as described in claim 8, wherein said movable fulcrum further comprises a bent rod, one end of which is equipped with a cylindrical and rotatable fulcrum, and the opposite end of which is equipped with a graduated scale.

* * * * *